(12) United States Patent
Kee et al.

(10) Patent No.: US 10,629,161 B2
(45) Date of Patent: Apr. 21, 2020

(54) AUTOMATIC MULTI-CLOCK CIRCUIT GENERATION

(71) Applicant: NATIONAL INSTRUMENTS CORPORATION, Austin, TX (US)

(72) Inventors: Hojin Kee, Austin, TX (US); Tai A. Ly, Austin, TX (US); Adrian P. Deac, Bistrita (RO); Adam T. Arnesen, Pflugerville, TX (US)

(73) Assignee: National Instruments Corporation, Austin, TX (US)

( * ) Notice: Subject to any disclaimer, the term of this patent is extended or adjusted under 35 U.S.C. 154(b) by 239 days.

(21) Appl. No.: 15/688,196

(22) Filed: Aug. 28, 2017

(65) Prior Publication Data
US 2019/0066626 A1 Feb. 28, 2019

(51) Int. Cl.
| | | |
|---|---|---|
| G06F 1/04 | (2006.01) | |
| G06F 1/12 | (2006.01) | |
| G06F 5/06 | (2006.01) | |
| G09G 5/00 | (2006.01) | |
| G06F 1/08 | (2006.01) | |

(Continued)

(52) U.S. Cl.
CPC ..... *G09G 5/008* (2013.01); *G01R 31/318552* (2013.01); *G06F 1/08* (2013.01); *G06F 16/90* (2019.01); *G06F 17/18* (2013.01); *G06F 17/505* (2013.01); *G06F 17/5054* (2013.01);
(Continued)

(58) Field of Classification Search
CPC ....... G09G 5/008; G06F 16/90; G06F 17/505; G06F 1/08; G06F 17/18; G11C 7/1066; G01R 31/318552
See application file for complete search history.

(56) References Cited

U.S. PATENT DOCUMENTS

| | | |
|---|---|---|
| 8,448,155 B2 | 5/2013 | Bordelon et al. |
| 8,478,967 B2 | 7/2013 | Bordelon et al. |

(Continued)

OTHER PUBLICATIONS

National Instruments Corporation (NI): "Implementing Multiple Clock Domains (FPGA Module)"—LabVIEW 2011 FPGA Module Help; Jun. 2011; retrieved Oct. 22, 2018 from the internet: <http://zone.ni.com/reference/en-XX/help/371599G-01/lvfpgaconcepts/implementing_domains/>(3 pages).

(Continued)

*Primary Examiner* — Xuxing Chen
(74) *Attorney, Agent, or Firm* — Kowert Hood Munyon Rankin and Goetzel PC; Jeffrey C. Hood; Luke S. Langsjoen

(57) ABSTRACT

Hardware may be created with different clock speeds used for different components of the system. Clock and throughput requirements on the interface circuitry of hardware components may set limits which are lower requirements for functional components. It may be advantageous to use more or fewer of some functional blocks or interface circuits in order to reduce cost, increase performance or reliability, reduce the requirements for additional parts, or other beneficial factors. Accordingly, it may be advantageous to generate hardware utilizing more than a single clock frequency. Generating instructions which indicate different clock frequencies for separate components may be difficult or time consuming; generating these instructions automatically may provide significant benefits in time savings, increased productivity, increased performance of hardware, or other benefits.

19 Claims, 9 Drawing Sheets

(51) Int. Cl.
*G11C 7/10* (2006.01)
*G06F 17/18* (2006.01)
*G06F 17/50* (2006.01)
*G01R 31/3185* (2006.01)
*G06F 16/90* (2019.01)

(52) U.S. Cl.
CPC ........ *G11C 7/1066* (2013.01); *G06F 2217/62* (2013.01); *G06F 2217/84* (2013.01)

(56) References Cited

U.S. PATENT DOCUMENTS

| | | |
|---|---|---|
| 8,510,709 B2 | 8/2013 | Bordelon et al. |
| 9,733,914 B2 | 8/2017 | Yi et al. |
| 2012/0200322 A1* | 8/2012 | Block .................. H04L 7/0337 327/142 |
| 2017/0068297 A1* | 3/2017 | Huang .................. G06F 1/3206 |
| 2018/0159627 A1* | 6/2018 | Fazal ............... H04B 10/25752 |

OTHER PUBLICATIONS

Senan, Kailas: "Multiclock Designs in FPGA"—Open Cores; Jan. 1, 2008; retrieved Oct. 22, 2018 from the internet: <http://opencores.org/articles,1199340900> (3 pages).

"Programmable Logic"—Programmable Logic Online Store—Future Electronics; retrieved Oct. 22, 2018 from the internet: <http://www.futureelectronics.com/en/programmable-logic/programmable-logic.aspx> (9 pages).

National Instruments Corporation (NI): "Hardware Description Language"—VLSI Tutorial—Mepits; Jul. 15, 2014; retrieved Oct. 22, 2018 from the internet: <https://www.mepits.com/tutorial/143/VLSI/Hardware-Description-Language> (7 pages).

* cited by examiner

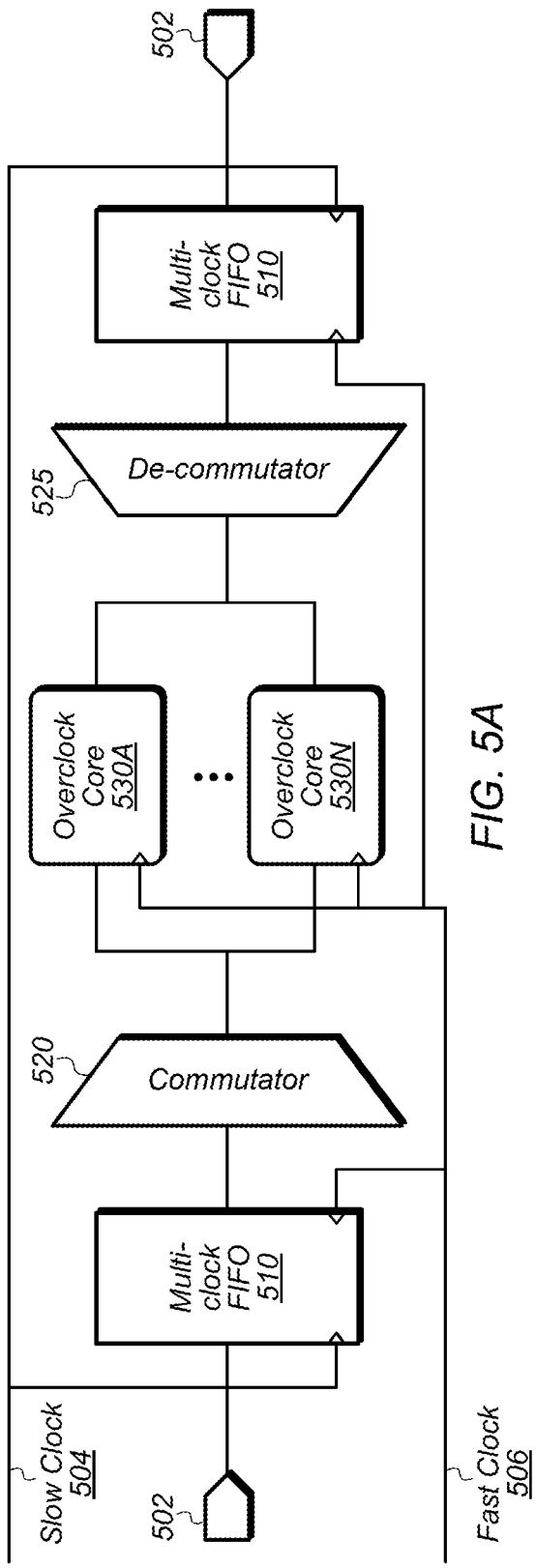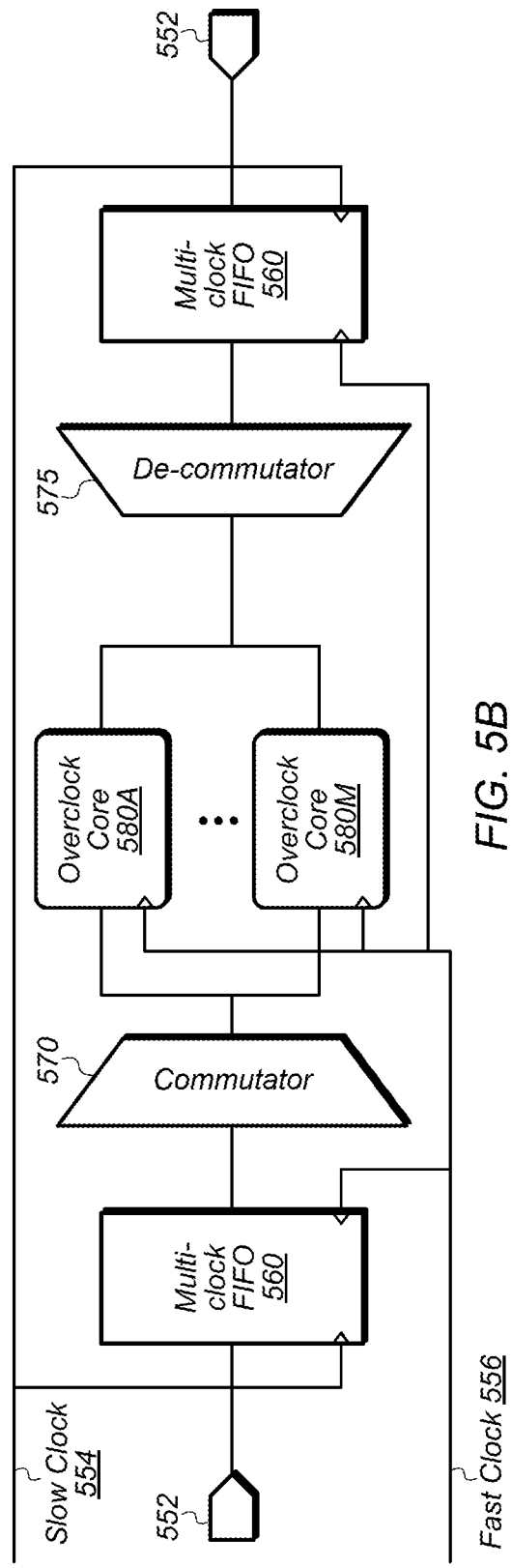
FIG. 5A
FIG. 5B

AUTOMATIC MULTI-CLOCK CIRCUIT GENERATION

BACKGROUND

Technical Field

This disclosure relates generally to the field of circuit design, and more particularly to automatically generating circuit elements driven by clocks with different frequencies.

Description of the Related Art

Hardware circuits such as FPGAs or ASICs may be configured to perform various kinds of calculations. When compiling hardware description code to generate output data for programming or configuring a circuit, there may be clock and throughput requirements on interface circuitry through which data is transferred into and out of different hardware blocks. For example, FPGAs may include dedicated interface circuitry between programmable functional blocks. It may be desirable, however, to run circuit blocks at a higher frequency than an interface block.

SUMMARY

Hardware devices, including programmable hardware elements, may be implemented using interface elements that receive input data and operate at one clock frequency and functional elements that operate at another clock frequency. Clock and throughput requirements on the interface circuitry of hardware components may set clocking limits that are lower than what functional components may tolerate. For example, data input may be limited to a clock speed of 40 MHz, while functional blocks may process data at 80 MHz, 120 MHz, or other frequencies.

It may be advantageous to use more or fewer of some functional blocks or interface circuits in order to reduce cost, increase performance or reliability, reduce the requirements for additional parts, or other beneficial factors. Accordingly, it may be advantageous to generate hardware utilizing more than a single clock frequency. For example, interface circuitry may be run at one frequency while functional components may be run at a higher frequency. In some embodiments, functional components may have more clock cycles in which to process incoming data than the number of clock cycles available at the interface.

Generating instructions which indicate different clock frequencies for separate components may be difficult or time consuming; generating these instructions automatically may provide significant benefits in time savings, increased productivity, increased performance of hardware, or other benefits.

BRIEF DESCRIPTION OF THE DRAWINGS

FIG. 5A-B are block diagrams illustrating other exemplary multi-clock hardware configurations, according to some embodiments.

Figure 1:
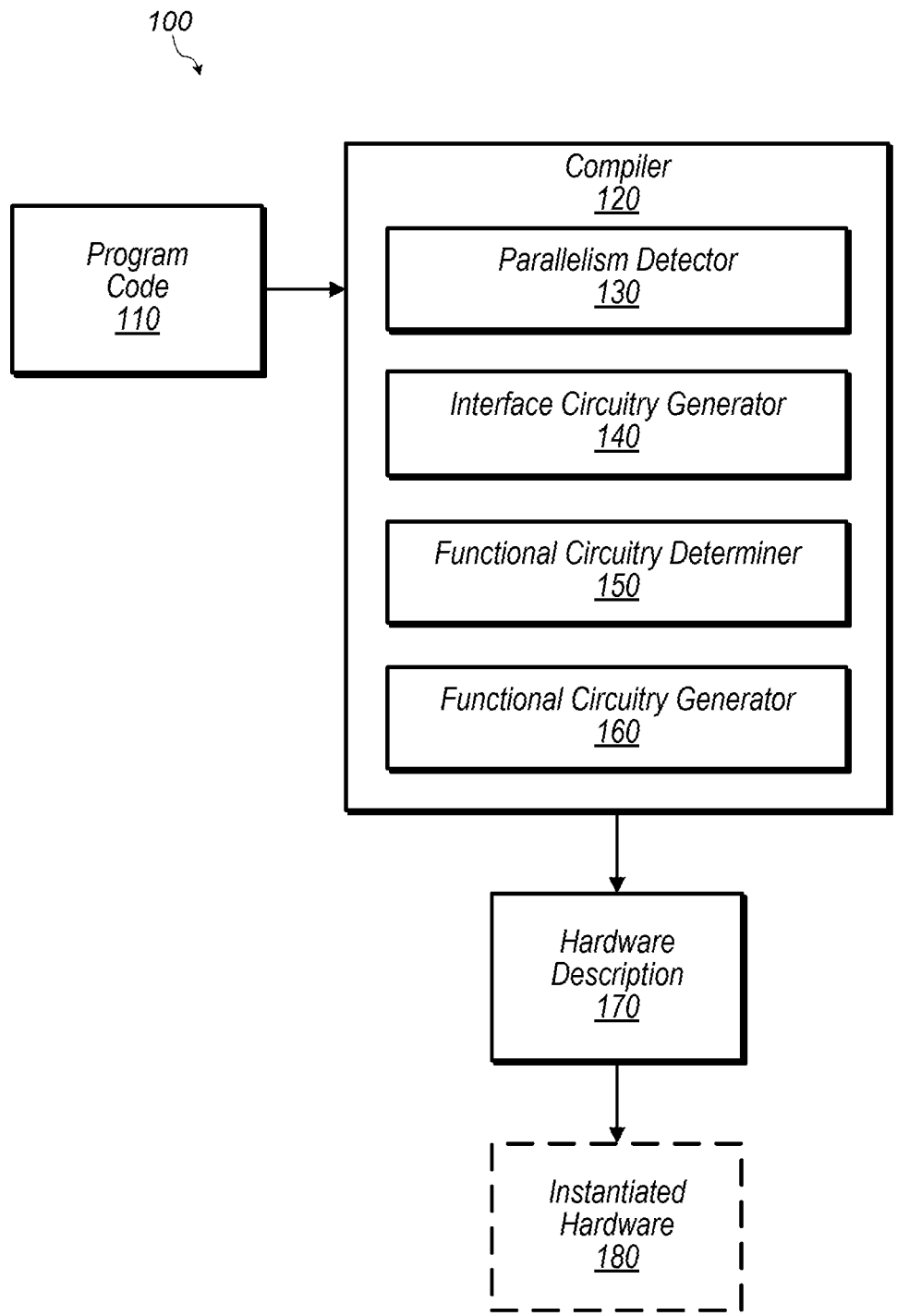
FIG. 1 is a block diagram illustrating a system for generating hardware description data based on an input program, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure, including the appended claims. Particular features, structures, or characteristics may be combined in any suitable manner consistent with this disclosure.

It is to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to generate a hash value" is intended to cover, for example, a mobile device that performs this function during operation, even if the device in question is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Overview of Multi-Clock Circuitry

In various disclosed embodiments, circuitry may be created with different clock speeds used for different components of the system. Clock and throughput parameters (e.g., based on capabilities of interface circuitry) may set limits that are lower than other components are capable of operating. For example, data input at an interface may be limited to a clock speed of 40 MHz, while functional blocks configured to receive data from the interface may be configured to process data at 80 MHz, 120 MHz, or other frequencies.

In some embodiments, hardware (e.g., a programmable hardware device being programmed) may have constraints that include, without limitation: a maximum or minimum amount of area for circuitry, clock speed of functional components, or number of functional blocks. It may be advantageous to use more or fewer of some functional blocks or interface circuits in order to reduce cost, increase performance or reliability, reduce the requirements for additional parts, etc.

Accordingly, it may be advantageous to automatically generate hardware with different portions that utilize multiple different clock frequencies. For example, interface circuitry may be run at one frequency while functional components may be run at a higher frequency. In some embodiments, this may provide functional components with more clock cycles in which to process incoming data than the number of clock cycles available at the interface.

When compiling a program for implementing on hardware (e.g. on an FPGA or ASIC) certain program statements may specify that a specific number of copies of the same function that may be run in parallel, in some embodiments. A parallel "for" loop is one example of such a statement, where different iterations of the loop may be performed independently. These program statements may be referred to as an indication of "execution parallelism" for the function. The compiler may choose to use a number of different functional hardware blocks to implement copies of the function in parallel.

In some embodiments, execution parallelism is related to performing calculations or processing data at the same time. As one non-limiting example, for a function f(y)=2y, and a list of numbers on which the function is to be performed, performing the multiplication in parallel may include multiplying each number of the list by 2 at the same time, e.g. using a separate processor or calculating circuit for each number. Execution parallelism may include executing program instructions at substantially the same time, at overlapping times, beginning at substantially the same time, or other timings with at least partial overlap in execution. Execution parallelism may include executing the same instructions in parallel and/or executing different instructions in parallel.

Non-limiting examples of code that may indicate execution parallelism include, but are not limited to: function, subprogram, procedure, basic block, for/generate statement in VHDL, Verilog, and SystemVerilog; "Parallel FOR loop" structure in LabVIEW; ParFor in C, Matlab, Python, Fortran; "thread" in python; "replicate" structures in LabVIEW; Async/Await functions in C#; task parallel library tasks in C#; "for/generate" in VHDL; thread functions in Java, and so on.

In some embodiments, a compiling program may detect a parallel statement in the program for implementing on hardware; the parallel statement may specify a parallelism parameter, e.g., indicating that up to K instances of a function can be correctly performed in parallel. In some embodiments, the compiler may have default preferences, or preferences specified by a user, including the frequency of a base clock or other clocks. The compiler may automatically generate a functional block with a clock speed which is a multiple of the base clock, and then create a number, e.g. N, of these functional blocks and implement the K parallel functions onto these N functional blocks. In some embodiments, the compiler may then create all interface and data routing circuitry required to operate the functional blocks. In some embodiments, when N is smaller than K, ones of the functional blocks are configured to perform the function multiple times serially in order to perform all K instances of the function.

In some embodiments, the compiler may choose a number of functional blocks for parallel operation based on constraints relating to data input clock speed, functional block clock speed, number of functional blocks, total number of circuit components, or other constraints. Constraints may be entered by a user, stored in a library for hardware being configured, etc. In some embodiments, the compiler may generate multiple configurations that use different numbers of parallel functional blocks (and/or different clock speeds) and select one or more of the configurations according to one or more criteria. Criteria may include power, performance, and/or resource utilization of each configuration, for example. In some embodiments, resources utilized may include the amount of available programmable elements in a programmable hardware device, the amount of memory available to an element, the number of processing elements used, the number of data busses required, etc.

In some embodiments, the compiler may output instructions for instantiating hardware in a programmable hardware device (or ASIC). In some embodiments, a device executing the compiler may also instantiate the hardware in a programmable hardware device (or ASIC) or may interface with other hardware or software for instantiating the hardware.

Exemplary Compiler System configured to Generate Multi-Clock Circuitry

Turning now to FIG. 1, the illustrated system 100 executes a compiler, according to some embodiments. In the illustrated embodiment, program code 110 is a program written in a hardware description language that comprises instructions that specify functionality of hardware to be implemented in circuitry (e.g., a programmable hardware device). In other embodiments, program code 110 may not be written in a hardware description language (e.g. VHDL, Verilog, etc.); program code 110 may be written in a general purpose programming language (e.g. C, C++, C#, etc.), a scripting language (e.g. Perl, Python, etc.), or other programming language (e.g. Labview, etc.).

In some embodiments, program code 110 specifies hardware to be used for instantiation. In other embodiments, the hardware to be used may be determined by compiler 120 (e.g., based on functionality specified in program code 110), or may be specified as an input to compiler 120. Program code 110 may be stored on a non-transitory computer readable storage medium.

Compiler 210 in the illustrated embodiment receives program code 110 as an input, and is configured to output hardware description 170. In the illustrated embodiment, compiler 210 includes a set of modules including a parallelism detector 130, interface circuitry generator 140, functional circuitry determiner 150, and functional circuitry generator 160. These modules may operate sequentially or in parallel. Operations may be performed on program code 110, on the outputs from other modules, or combinations thereof.

As used herein, the term "module" refers to circuitry configured to perform specified operations or to physical non-transitory computer readable media that stores information (e.g., program instructions) that instructs other circuitry (e.g., a processor) to perform specified operations. Such circuitry may implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Parallelism detector 130, in some embodiments, is configured to process program code 110 to identify code indicative of execution parallelism for a function. In some embodiments, the indication includes at least a first number of instances of the function that operate on different sets of input data. Examples of code that may indicate parallelism include, but are not limited to: function, subprogram, procedure, basic block, for/generate statement in VHDL, Verilog, and SystemVerilog; "Parallel FOR loop" structure in LabVIEW; ParFor in C, Matlab, Python, Fortran; "thread" in python; "replicate" structures in LabVIEW; Async/Await functions in C#; task parallel library tasks in C#; "for/generate" in VHDL; thread functions in Java, and so on.

In some embodiments, parallelism detector 130 may process only a portion of program code 110 or parallelism detector 130 may process program code 110 multiple times. In some embodiments, parallelism detector 130 may output information related to processing program code 110 before, during, or after processing. Output from parallelism detector 130 may be displayed, saved to a non-transitory computer-readable medium, etc.

Interface circuitry generator 140, in some embodiments, is configured to process program code 110 and/or outputs from parallelism detector 130. In some embodiments, the processing performed by interface circuitry generator 140 is based at least in part on parameters inputs from a user or otherwise specified. For example, interface circuitry generator 140 may generate interface circuitry based on the amount, type, speed, size, frequency or other characteristics of input data that to be interfaced. In some embodiments, characteristics of the data to be used as input data to interface circuitry may be specified in program code 110, may be user input, or may be received from compiler 120.

In some embodiments, interface circuitry may include wiring, connections, functional elements, modules, or other devices or configurations for receiving data from a data source and sending data to a functional block for processing. Interface circuitry may include circuitry for receiving data at one clock speed and sending data at another clock speed, circuitry for distributing data to various functional blocks, circuitry for aggregating data from various functional blocks, or other circuitry for interfacing between data sources and functional elements.

A multi-clock buffer is one example of interfacing circuitry that is configured to receive data at one clock speed and distribute data at another clock speed. In some embodiments, a multi-clock buffer may include a first-in first-out (FIFO) storage in which the data received first is the first data to be sent out. In some embodiments, input data may be received with a number of channels, and the data may be sent out with fewer channels. For example, if a multi-clock FIFO uses two clock signals, one with twice the frequency of the other, the portion of the multi-clock FIFO using a faster clock may send data using half as many channels.

A commutator is another example of interfacing circuitry that is configured to receive input data and switch between distributing the input data to different ones of the functional blocks. In some embodiments, a commutator may distribute data in a "round robin" fashion, where each of the associated functional blocks receives data in turn, one after the other. In other embodiments, a commutator may distribute data according to a different pattern, including distributing data to multiple functional blocks at once, distributing data to some functional blocks more or less often than others, or other manners of distributing data.

A de-commutator may also be used for interfacing functional blocks with data. In some embodiments, a de-commutator performs a reverse function of a commutator, e.g. a de-commutator may receive data from multiple functional blocks and transmit data to a single output. For example, a de-commutator may receive a processed result from each of a number of functional blocks and may send the data to a multi-clock FIFO at different times or after combining the data to a single output. In some embodiments, a single output may include multiple channels of data.

Functional circuitry determiner 150, in the illustrated embodiment, is configured to process program code 110 and/or outputs of other modules. Functional circuitry determiner 150 may perform calculations to determine the number, type, or configuration of functional blocks needed to implement the functionality specified by program code 110. In some embodiments, determining the number of functional blocks may be based on the rate of data input, the performance characteristics of the functional blocks, the clock frequencies of interface circuits or functional blocks, the number of instances of a function to be run, program code 110, other information relevant to processing data, or combinations or subsets thereof. In some embodiments, functional circuitry determiner 150 determines, for a function with specified parallelism, to use the number of functional blocks specified by parallelism detector 130. For example, the parallelism detector may determine that K parallel instances of a function may be implemented and functional circuitry determiner 150 may determine to instantiate K parallel functional blocks. In some embodiments, functional circuitry determiner 150, may determine to include fewer functional blocks than K, e.g., based on resource limitations in an FPGA being programmed. In some other embodiments, functional circuitry determiner 150 may determine to include more functional blocks than K; for example, the determination may be based on lower voltage and/or power considerations.

Parameters for determining the functional circuitry may be provided as user input to compiler 120 or indicated in program code 110, in some embodiments. In some embodiments, determining the number of functional blocks may be based at least in part on a set of constraints, wherein the constraints include at least one of area, speed, or number of functional blocks. For example, compiler 120 may attempt to increase the number of functional blocks used in parallel to increase speed or decrease the number of functional blocks used in parallel to reduce area. Further, the circuitry being implemented may have a fixed limit on total number of functional blocks, functional blocks of a certain type, etc.

In some embodiments, functional circuitry determiner 150 is configured to determine the functional circuitry by generating multiple configurations that use different numbers of functional blocks for a given parallel function. Functional circuitry determiner 150 may then simulate, analyze, or otherwise evaluate the performance of the different configurations and may select one of the configurations. In some embodiments, selecting a generated circuit may be based on parameters input by a user, indicated by program code 110, set as defaults, or other manner of evaluating performance.

Functional circuitry generator 160, in some embodiments, is configured to generate instructions for instantiating hardware including the number of functional blocks determined by functional circuitry determiner 150. In some embodiments, functional circuitry generator 160 may generate data that specifies instantiation of functional circuitry configured to receive input data formatted in the manner output by interface circuitry generated by interface circuitry generator 140.

In some embodiments, functional circuitry may include circuits or modules configured to perform mathematical operations, for example addition, substraction, Fourier transformations, or other simple or complex calculations.

In the illustrated embodiment, compiler 120 is configured to output hardware description 170. In some embodiments, hardware description 170 includes data that specifies instantiating a hardware device (as a non-limiting example, a programmable hardware element). In some embodiments, hardware description 170 may be a text based description, a machine code description, a binary description, or other descriptions. Hardware description 170 may be saved as a file on a non-transitory computer-readable medium, may exist in a transitory computer-readable medium, may be transmitted to another device or computer, may be transmitted across a network, etc.

In some embodiments, the computing device that executes compiler 120 may also configure instantiated hardware 180. Instantiated hardware 180 may be instantiated based on hardware description 170. In some embodiments, instantiated hardware 180 may be instantiated without hardware description 170 being generated.

Instantiated hardware 180 may comprise various types of hardware. Non-limiting examples of hardware include programmable hardware elements such as field programmable gate arrays (FPGAs), application-specific integrated circuits (ASICs), graphics processing units (GPUs), multicore processors, central processing units (CPUs), co-processors, application-specific instruction-set processors (ASIP), soft IP blocks, hard macro blocks, IP blocks, module generator blocks, nodes on a heterogeneous network of compute blocks, a computer, a network of computers, embedded cores, or other computational resources.

Exemplary Multi-Clock Circuits

Figure 2:
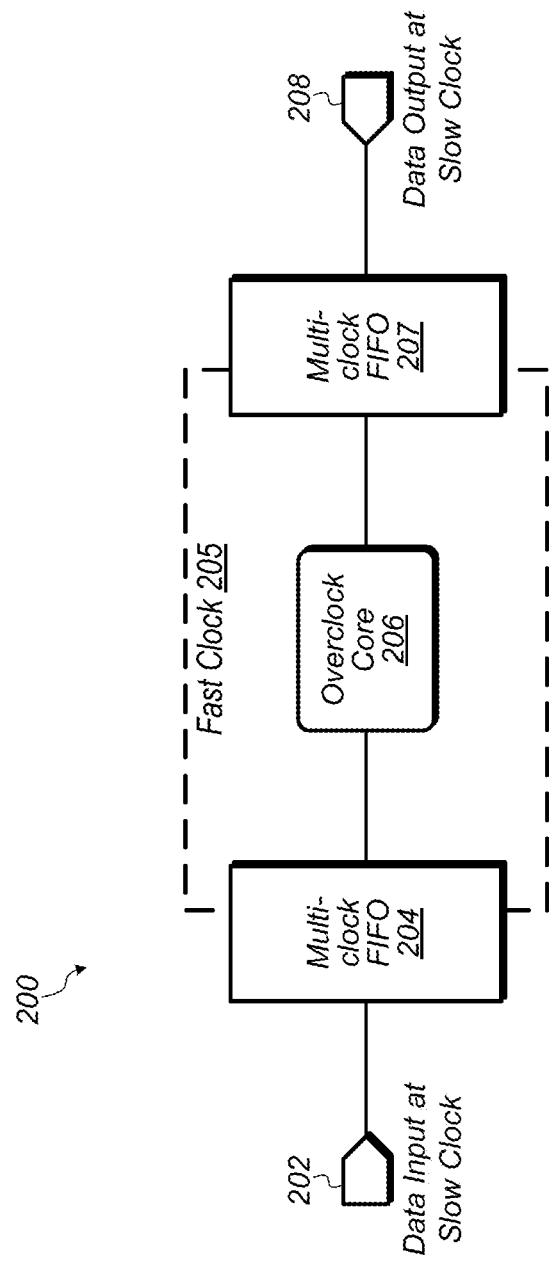
FIG. 2 is a block diagram illustrating an exemplary multi-clock hardware configuration, according to some embodiments.
Figure 3:
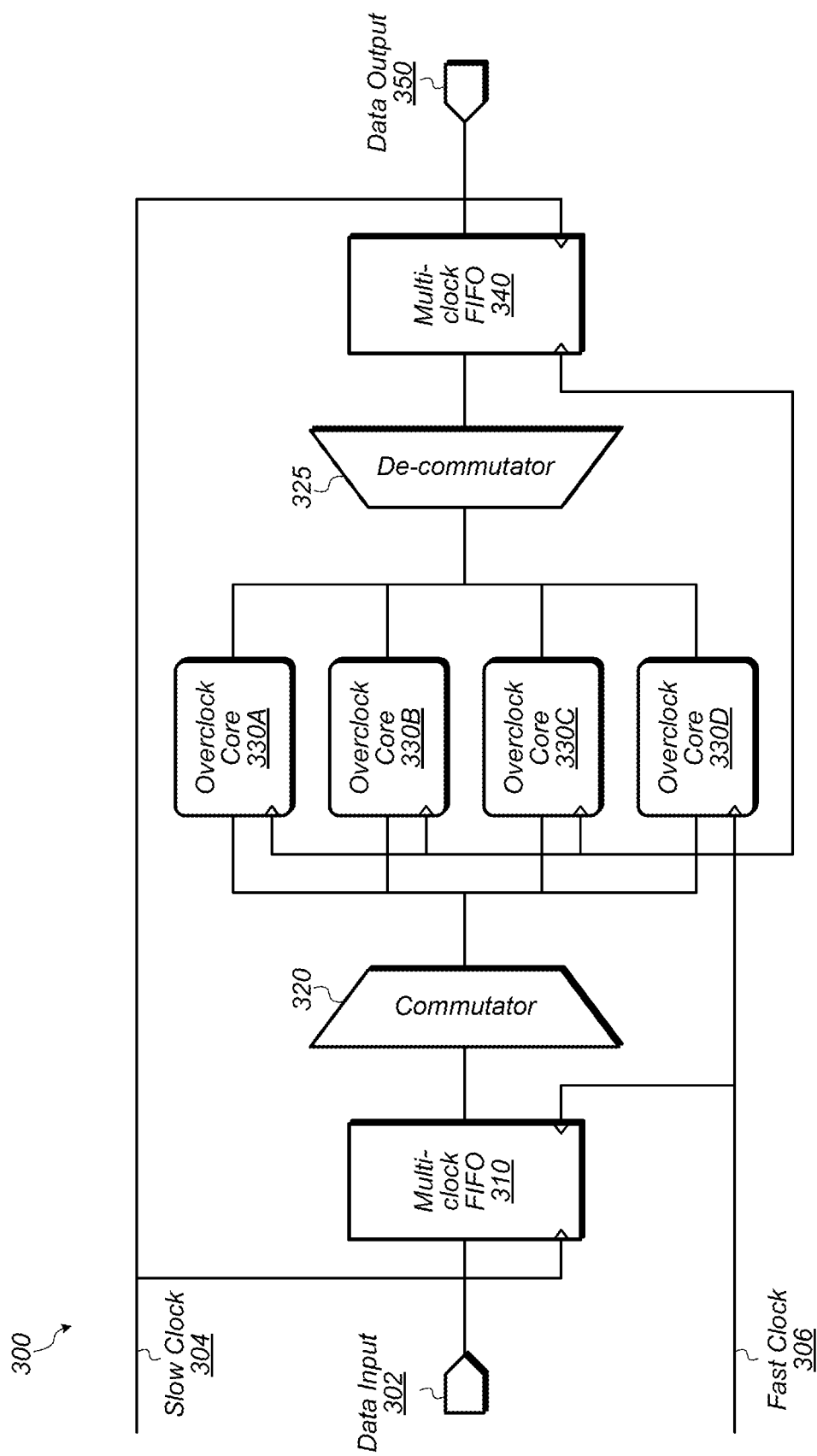
FIG. 3 is a block diagram illustrating a more complex exemplary multi-clock hardware configuration, according to some embodiments.
Figure 4:
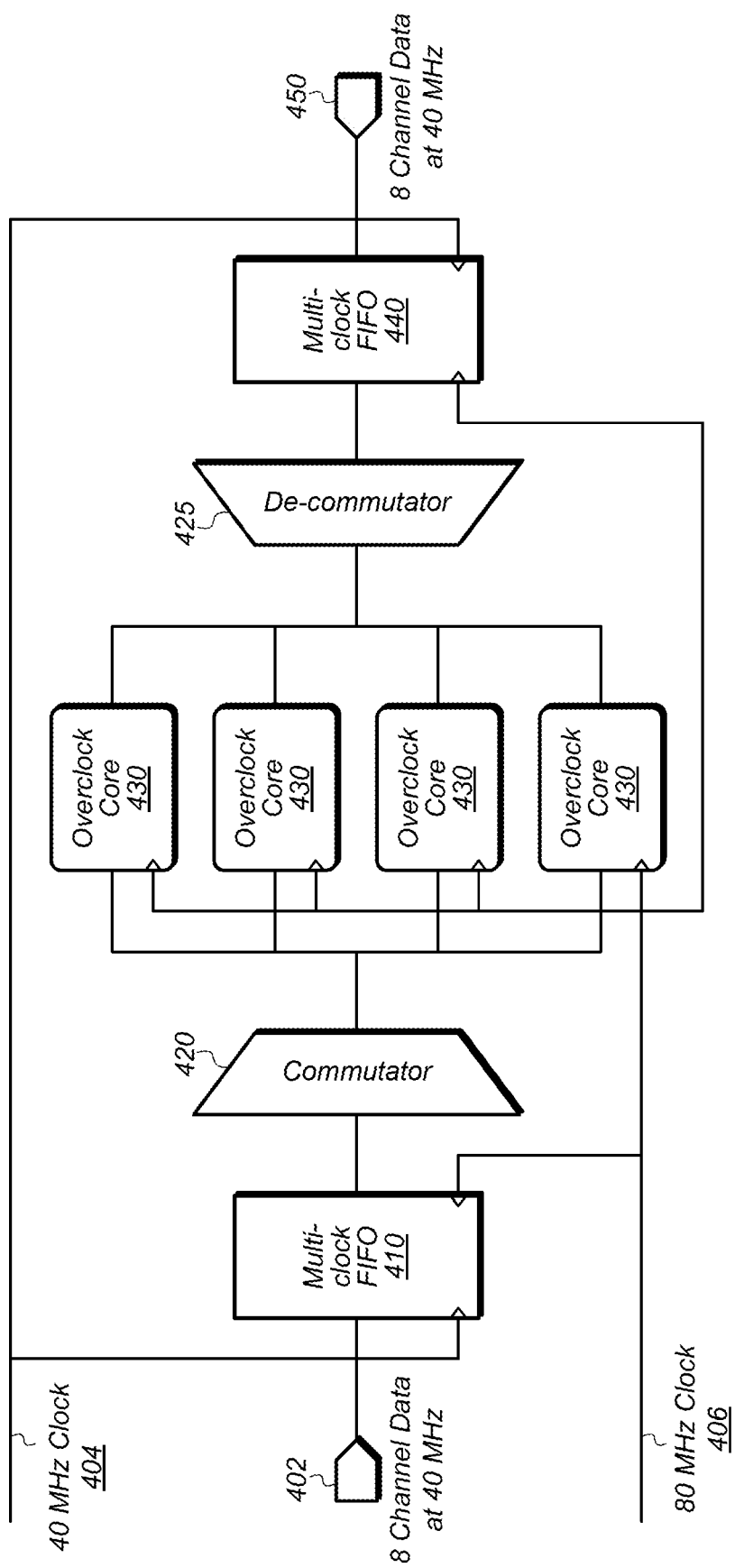
FIG. 4 is a block diagram illustrating a specific exemplary values for the multi-clock hardware configuration of FIG. 3, according to some embodiments.

FIG. 2 illustrates exemplary hardware 200 which may be instantiated by system 100, according to some embodiments. In the illustrated embodiment, hardware 200 includes data input 202, multi-clock FIFO 204, overclock core 206, multi-clock FIFO 207, and data output 208. In the illustrated embodiment, hardware 200 does not include parallel functional blocks, but is shown as a simple example of multi-clock circuitry. FIGS. 3-5, discussed in further detail below, show multi-clock circuitry with parallel functional blocks, according to some embodiments.

In the illustrated embodiment, data input 202 operates at a slow clock frequency, relative to a clock frequency at which core 206 operates. Thus, core 206 is referred to as an "overclock" core. Data input 202 sends data (e.g., received from other functional blocks or an I/O port of hardware 200) to multi-clock FIFO 204 at the slow clock frequency, and multi-clock FIFO 204 sends data at the frequency of fast clock 205 to overclock core 206. In the illustrated embodiment, overclock core 206 processes data and sends the resulting data to multi-clock FIFO 207. Multi-clock FIFO 207 receives data at the frequency of fast clock 205 and sends data to other functional blocks or to an output port at the slow clock frequency of data output 208.

In the illustrated embodiment, a single functional block, overclock core 206 is implemented. In some embodiments, overclock core 206 may perform one or more functions, may perform various calculations, may perform a function at least twice for different input data, or may perform other computations. Overclock core 206 may have been generated by functional circuitry generator 160. In some embodiments, hardware 200 may be described by hardware description 170 and instantiated by compiler 120 or other manners of instantiating hardware, as described previously.

In some embodiments, data input and output may comprises multiple channels of data corresponding to multiple sources and/or targets.

FIG. 3 illustrates another example of hardware 300 which may be instantiated by system 100, according to some embodiments. In the illustrated embodiment, hardware 200 includes the following interface circuitry elements: data input 302, data output 350, multi-clock FIFOs 310 and 340, commutator 320, and de-commutator 340. In the illustrated embodiment, hardware 200 include four functional blocks (overclock cores 330). In the illustrated embodiment, data input 302, data output 350, and multi-clock FIFOs 310 and 340 are clocked by slow clock 304, which has a lower frequency than fast clock 306, which drives the remaining illustrated elements of hardware 300. In some embodiments, data may arrive according to slow clock 304 and be input into multi-clock FIFO 310 at the frequency of slow clock 304. Multi-clock FIFO 310 may then send data to commutator 320 according to fast clock 306. Commutator 320, in the illustrated embodiment, may be configured to send data to each of overclock cores 330 according to the frequency of fast clock 306. In some embodiments, commutator 320 sends data to overclock cores 330 consecutively, in a repeating manner (e.g., to core 330A, then 330B, then 330C, then 330D, then 330A, and so on).

Overclock cores 330, in the illustrated embodiment, are configured to operate at the frequency of fast clock 306. In some embodiments, operating at the faster clock rate may allow overclock cores 330 to perform calculations as fast as or faster than input data may be received. Four overclock cores 330 are illustrated in FIG. 3; in some embodiments, fast clock 306 may be twice the frequency of slow clock 304 and 8 functions may be indicated by parallelism detector 130. In this example, the overclock cores may each perform a function twice, serially, to perform the 8 function instances. In another example instantiation, two cores clocked at four times the interface clock rate may each perform the function four times, to perform the 8 function instances. The compiler may select between these configurations, among others, based on various constraints.

In the illustrated embodiment, overclock cores 330 send output data to de-commutator 325. In some embodiments, overclock cores 330 may send output data consecutively in the same manner as input data was received. In some embodiments, overclock cores may send data according to the order in which processing was complete, according to a different order than data was received, or in other manners.

In the illustrated embodiment, de-commutator 325 receives data from overclock cores 330 according to fast clock 306 and send data to multi-clock FIFO 340. De-commutator 325 may send data in the same order as received, in a different order, or may perform other operations on the received data, in some embodiments. Multi-clock FIFO 340 receives data at the frequency of fast clock 360, in the illustrated embodiment, and sends it to data output 350 at the frequency of slow clock 306. In some embodiments, multi-clock FIFO 340 may have more channels in the data output than in the data input, for example if fast clock 306 has a frequency twice that of slow clock 304, multi-clock FIFO 340 may output twice as many channels of data.

Turning now to FIG. 4, specific non-limiting exemplary values for the configuration of FIG. 3 are shown.

In the example of FIG. 4, the slow clock is a 40 MHz clock 404 and the fast clock is a 80 MHz clock 406. Input data 402 includes data for 8 channels, at 40 MHz, in the illustrated embodiment. Each channel may include input data for an instance of the function to be performed at least partially in parallel. Accordingly, multi-clock FIFO 410 may receive 8 channels of data at 40 MHz and send 4 channels of data at 80 MHz. In some embodiments, for each clock cycle that data is received on input data 402, two cycles of half as much data are sent to commutator 420.

Commutator 420 may operate at the frequency of 80 MHz clock 406 and receive four channels of data from multi-clock FIFO 410. In the illustrated embodiment, there are four instances of overclock core 430, each of which may correspond to a channel of data coming from multi-clock FIFO 410. In some embodiments, commutator 420 may split the four channels of data and send each channel to a core. In some embodiments, commutator 420 may perform other actions, including sending data to more than one core, or some data to the same core, or other manners of distributing data.

In the illustrated embodiment, overclock cores 430 process data, send the processed data to de-commutator 425, and then to multi-clock FIFO 440, and data output 450 in a similar manner as previously described. De-commutator 425 may receive data from each instance of overclock core 430 and combine the data into four channel data at 80 MHz to send to multi-clock FIFO 440. Multi-clock FIFO 440 may then output the data as eight channel data at 40 MHz.

In the illustrated embodiment, parallelism detector 130 may have detected that eight instances of a function may be indicated. In the illustrated embodiment, 80 MHz clock 406 has twice the slow frequency of 40 MHz clock 404; accordingly, four blocks of overclock core 430 may be specified or instantiated.

FIGS. 5A and 5B illustrate configurations with different amounts of parallelism, according to some embodiments. In the illustrated embodiment, the data input, output, and interface circuitry may be similar to that previously described with reference to FIG. 4. FIGS. 5A and 5B may have frequencies of 40 MHz for slow clocks 504 and 554 and parallelism detector 130 may indicate that a function may be performed eight times, for example.

In some embodiments, functional circuitry generator 160 may generate multiple configurations of functional circuitry for functional circuitry determiner 150 to use in determining the number of functional blocks. For example, in FIG. 5A, a configuration having N overclock cores 530 is illustrated. If N is 4, for example, fast clock 506 may have a frequency of 80 MHz. In FIG. 5B, a configuration having M overclock cores 580 is illustrated, where M is an integer different than N. If M is two, for example, fast clock 556 may have a frequency of 160 MHz.

In some embodiments, the number of functional blocks multiplied by the ratio of the fast clock to the slow clock may equal the number of instances of the function to be performed. For example, in embodiments where a function is indicated to be run eight times and a slow clock frequency may be 40 MHz, a fast clock may be 160 MHz with two functional blocks.

In some embodiments, functional circuitry determiner 150 may select between configurations, e.g. FIGS. 5A and 5B, based on their power, performance, and resource utilization. Other constraints may be used to select between configurations. In some embodiments, constraints may be input by a user or may be determined from program code 110. In various embodiments, functional circuitry determiner 150 may automatically select a configuration.

In some embodiments, the area usable for functional circuitry may be a constraint, e.g. there may be 1000 area units available, and each functional block may require 100 area units, and interface circuitry may require 200 area units. There may be several ways to configure functional blocks and interface circuitry that will meet the area constraint, for example 400 area units of functional blocks and 200 area units of interface circuitry, 600 area units of functional blocks and 400 units of interface circuitry, etc. In some embodiments, additional constraints (e.g. constraints input by a user) may be used to choose between configurations. For example, the processing speed may be constrained such that at least 6 functional blocks may be required to process data at a rate that meets the constraint. As another example, power consumption may be specified as a constraint or may be indicated as a design parameter that is more important than other parameters (e.g., more important than performance for a specific task, so long as minimum performance requirements are met). In some embodiments, user input may not indicate constraints, but may indicate preferences, for example, the preference that configurations with lower power consumption may be chosen before configurations with faster processing. Other constraints or preferences based on characteristics of the circuitry may be specified, and other configurations may be possible; specific examples given here (e.g. 1000 area units) are not intended to limit the scope of the present disclosure.

Figure 6:
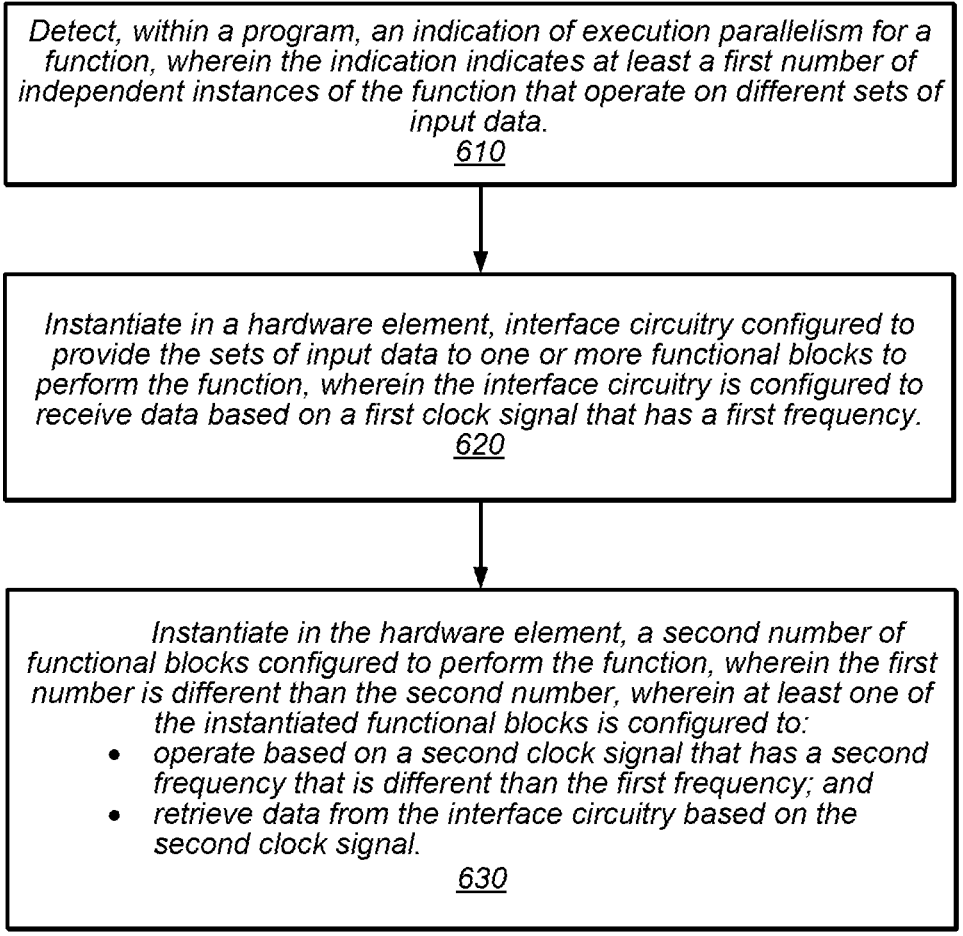
FIG. 6 is a flow diagram illustrating a method for instantiating multi-clock hardware, according to some embodiments.

FIG. 6 is a flow diagram illustrating a method for automatically determining a number of parallel instantiations of a functional block, according to some embodiments. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 610 in the illustrated embodiment, an indication of execution parallelism for a function is detected within a program. In some embodiments, the indication includes at least a first number of independent instances of the function that operate on different sets of input data. In some embodiments, the program may be written in a hardware description language. The program may comprise a text-based format, may be machine code, may be another format of program information, or combinations thereof. In some embodiments, detection is performed by a computer system without user input. In some embodiments, a user may specify characteristics of the program or the format of the program, or may select a subset of the program to be processed.

In some embodiments, different sets of data may include data that is similar in format, meaning, or content. In some embodiments, different sets of data may include data that comprises the same values or sets of values. Different functional blocks may process different sets of data sequentially or in parallel. In some embodiments, functional blocks may process similar quantities of input data or some functional blocks may process more or less data than other functional blocks.

At 620 in the illustrated embodiment, interface circuitry configured to provide the sets of input data to one or more functional blocks to perform the function is instantiated in a hardware element. In some embodiments, the interface circuitry is configured to receive data based on a first clock signal that has a first frequency. The first frequency may be specified by a user, detected in a program, or set as a default by a processing system, for example. In some embodiments, instantiation is performed without user input, or may require a user to input characteristics of the hardware to be instantiated. In some embodiments, the hardware element may be a programmable hardware element; in other embodiments it may be an ASIC.

At 630 in the illustrated embodiment, a second number of functional blocks configured to perform the function is instantiated in the hardware element. In some embodiments, the first number is different than the second number. At least one of the instantiated functional blocks may be configured to operate based on a second clock signal that has a second frequency that is greater than the first frequency, in some embodiments. At least one of the instantiated functional blocks may be configured to retrieve data from the interface circuitry based on the second clock signal. In some embodiments, the second clock signal may have a frequency that is a multiple of the first frequency. In some embodiments, the first number and/or first frequency is equal to the second number or second frequency. In some embodiments, the ratio of the second clock signal to the first clock signal may correspond to the number of functional blocks and the number of instances of the function. The ratio of the second frequency to the first frequency may correspond to the function performed by the functional blocks, the amount of input data to be processed, or other characteristics of the data, functional blocks, or interface circuitry.

In various embodiments, the disclosed techniques allow a compiler to automatically select an amount of parallelism for multi-clock circuitry based on various parameters, which may improve performance, reduce area, reduce design time, etc. while satisfying constraints (e.g., constraints imposed by hardware, performance requirements, cost, or other design constraints).

Figure 7:
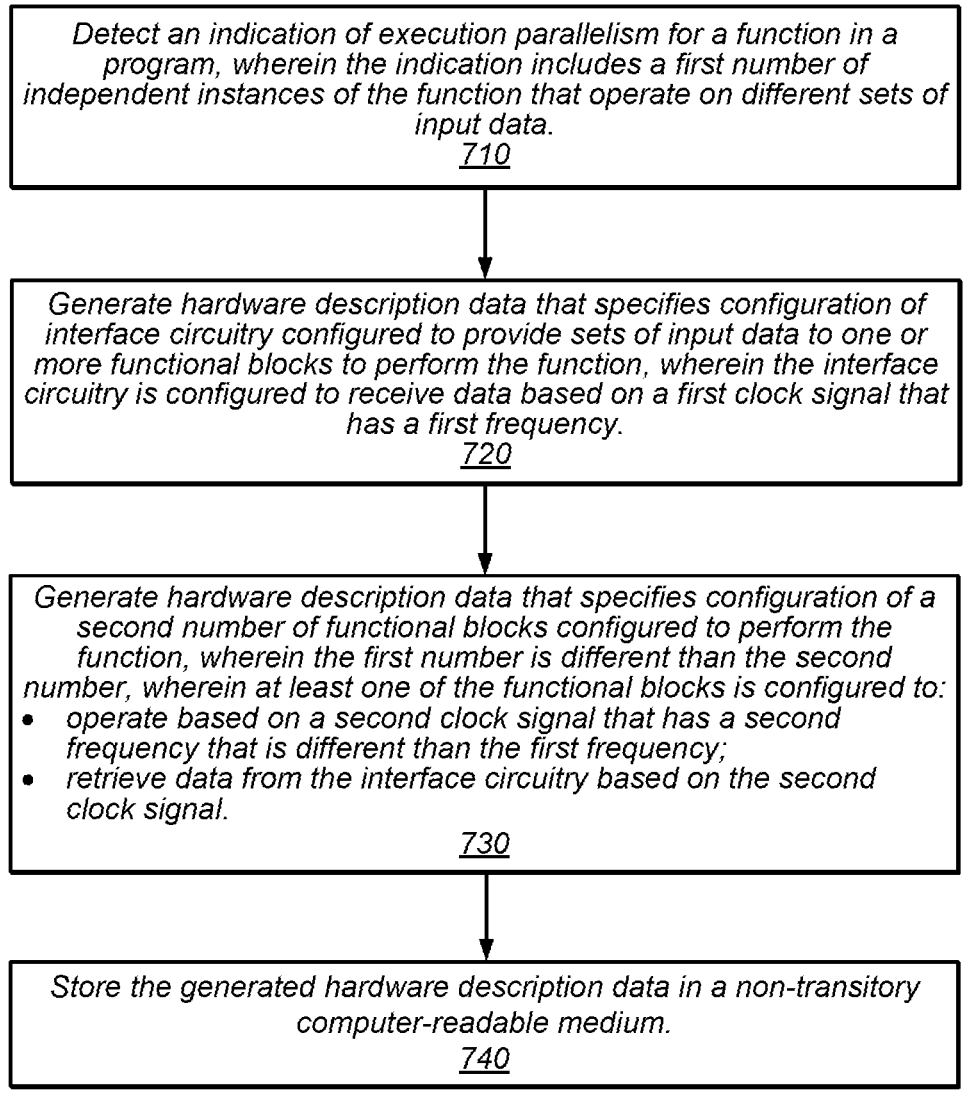
FIG. 7 is a flow diagram illustrating a method for generating a hardware description for use in instantiating hardware, according to some embodiments.

FIG. 7 is a flow diagram illustrating a method for generating a hardware description for use in instantiating hardware, according to some embodiments. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

The method illustrated in FIG. 7 is similar to the method of FIG. 6, but does not explicitly illustrate instantiating hardware. The generation of hardware description data that may be used for instantiating hardware is described in the illustrated embodiment.

At 710 in the illustrated embodiment, an indication of execution parallelism for a function in a program is detected. The indication indicates a first number of independent instances of the function, in the illustrated embodiment. In some embodiments, the first number of instances of the function may operate on different sets of input data, or they may operate on the same set of input data. Input data may be acquired from one or more sources over one or more periods of time. In some embodiments, detection is performed by a computer system without user input. In some embodiments, a user may specify characteristics which indicate execution parallelism, or may select a set of functions which may indicate execution parallelism.

At 720 in the illustrated embodiment, hardware description data is generated that specifies configuration of interface circuitry configured to provide sets of input data to one or more functional blocks to perform the function from 710. In some embodiments, the set of instructions is written in a hardware description language. In the illustrated embodiment, the instructions indicate that the interface circuitry is configured to receive data based on a first clock signal that has a first frequency. In some embodiments, the instructions may indicate that data may be received from multiple sources, or may be received from one or more channels. The instruction may indicate that data input may be performed using additional circuitry or components, or may be provided directly to the interface circuitry. In some embodiments, the set of instructions may indicate a value for the first frequency, or other information may be used to indicate the first frequency. At 730 in the illustrated embodiment, hardware description data is generated that describes a second number of functional blocks configured to perform the function of 710. In some embodiments, the set of instructions is written in a hardware description language. In the illustrated embodiment, the instruction may indicate that the first number of instances of the function is different than the second number of functional blocks. At least one of the functional blocks is configured to operate based on a second clock signal that has a second frequency that is different than the first frequency and retrieve data from the interface circuitry based on the second clock signal, in the illustrated embodiment. In some embodiments, the instructions may indicate that the first number of instances of the function is equal to than the second number of functional blocks, or that first frequency is the same as the second frequency. In some embodiments, at least one of the functional blocks may be configured to perform the function at least twice on different input data.

In some embodiments, all of the functional blocks may be configured to operate based on the second clock signal, or some of the functional blocks may be configured to operate based on the second clock signal and other functional blocks may be configured to operate based on another clock signal. In some embodiments, the second number of functional blocks may be related to the first and second frequencies and the first number of instances of the function. For example, the product of the second number of functional blocks and the ratio of the second frequency to the first frequency may be equal to the first number of instances of the function. In some embodiments, the second number of functional blocks may be related to the frequencies and functions in other ways. In some embodiments, data may be retrieved from the interface circuitry using a different number of channels than data was input into the interface circuitry.

At 740 in the illustrated embodiment, the generated hardware description data is stored in a non-transitory computer-readable medium. Non-transitory computer-readable media may include optical disks, magnetic disk drives, solid state drives, magnetic tape, paper punch cards, or other media.

In some embodiments, the generated instructions may be used to instantiate hardware. Instantiated hardware may be generated based entirely on the instructions, or additional information may be used to instantiate hardware in some embodiments. For example, user input may specify frequencies of operation or numbers, functional blocks, or other circuitry. In some embodiments, the instructions may indicate to instantiate multiple sets of hardware and evaluate them for performance.

Exemplary Computer System

Figure 8:
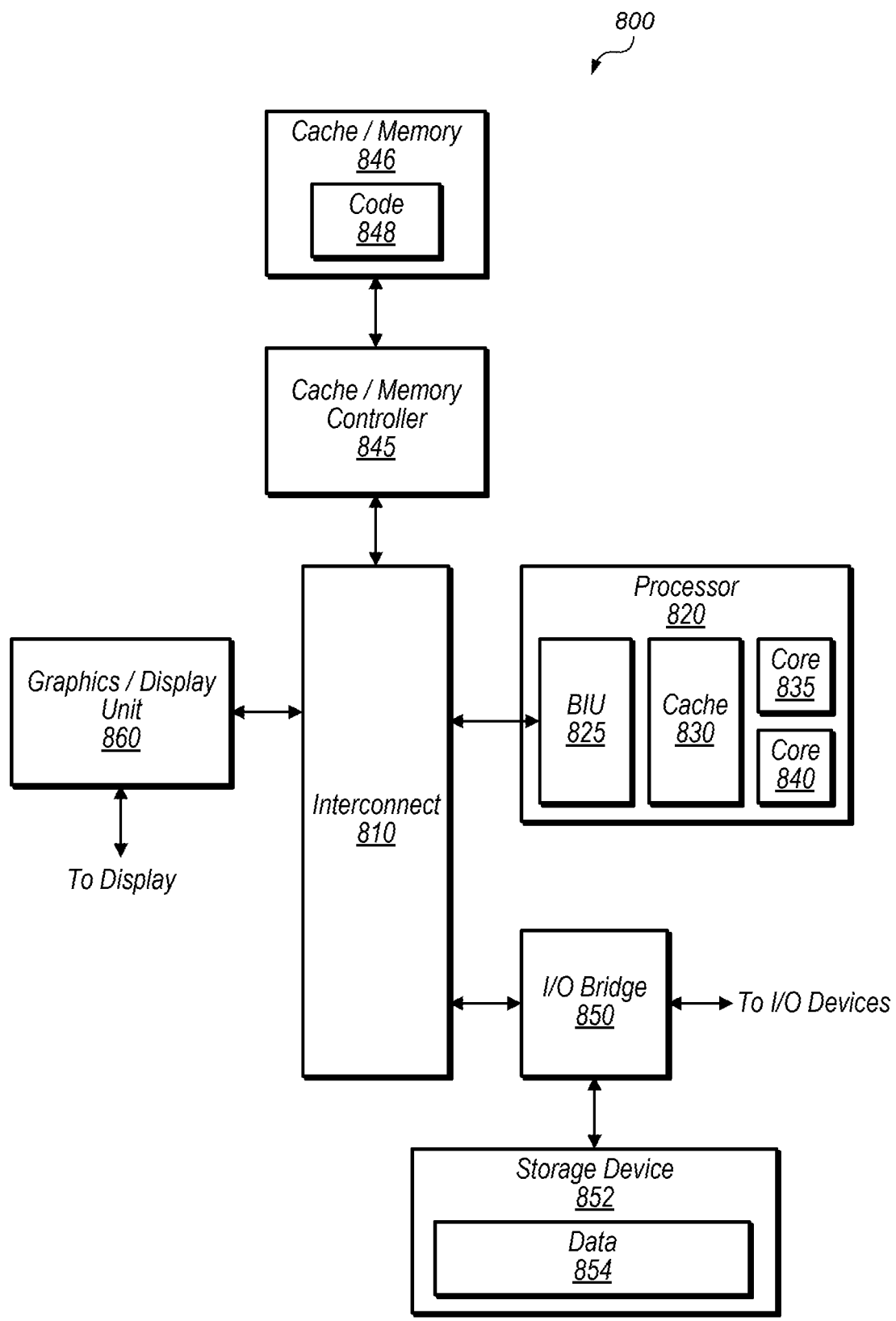
FIG. 8 is a block diagram illustrating a computer system, according to some embodiments.

Referring now to FIG. 8, a block diagram illustrating an embodiment of a device 800 is shown. In some embodiments, elements of device 800 may be included within a system on a chip. In the illustrated embodiment, device 800 includes interconnect 810, processor 820, input/output (I/O) bridge 850, storage device 852, data 854, cache/memory controller 845, cache/memory 846, code 848, and graphics/display unit 860.

Interconnect 810 may include various interconnects, buses, MUX's, controllers, etc., and may be configured to facilitate communication between various elements of device 800. In some embodiments, portions of interconnect 810 may be configured to implement various different communication protocols. In other embodiments, interconnect 810 may implement a single communication protocol and elements coupled to interconnect 810 may convert from the single communication protocol to other communication protocols internally.

In the illustrated embodiment, processor 820 includes bus interface unit (BIU) 825, cache 830, and cores 835 and 840. In various embodiments, processor 820 may include various numbers of processors, processor cores and/or caches. For example, processor 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in interconnect 810, cache 830, or elsewhere in device 800 may be configured to maintain coherency between various caches of device 800. BIU 825 may be configured to manage communication between processor 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between interconnect 810 and one or more caches and/or memories, including cache/memory 846. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

In the illustrated embodiment, cache/memory 846 contains code 848. In some embodiments, code 848 may be used to configure the computing system 800. In other embodiments, code 848 may include instructions for processor 820 to execute, such as instructions relating to the control of any of the systems or devices discussed above, or code 848 may include information directing the usage of I/O Bridge 850. Code 848 may include other information not described here, including but not limited to data, configurations for other components of computing system 800, or instructions to be executed by computing system 800.

As used herein, the term "coupled to" may indicate one or more connections between elements, and a coupling may include intervening elements. For example, in FIG. 8, graphics unit 860 may be described as "coupled to" a memory through interconnect 810 and cache/memory controller 845. In contrast, in the illustrated embodiment of FIG. 8, graphics unit 860 is "directly coupled" to interconnect 810 because there are no intervening elements.

Graphics/display unit 860 may include one or more processors and/or one or more graphics processing units (GPU's). Graphics/display unit 860 may receive graphics-oriented instructions, such as OPENGL® or DIRECT3D® instructions, for example. Graphics/display unit 860 may execute specialized GPU instructions or perform other operations based on the received graphics-oriented instructions. Graphics/display unit 860 may generally be configured to process large blocks of data in parallel and may build images in a frame buffer for output to a display. Graphics/display unit 860 may include transform, lighting, triangle, and/or rendering engines in one or more graphics processing pipelines. Graphics/display unit 860 may output pixel information for display images.

Graphics/display unit 860 may be configured to read data from a frame buffer and provide a stream of pixel values for display. Graphics/display unit 860 may be configured as a display pipeline in some embodiments. Additionally, Graphics/display unit 860 may be configured to blend multiple frames to produce an output frame. Further, Graphics/display unit 860 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850. In the illustrated embodiment, I/O Bridge 850 is coupled to storage device 852.

In some embodiments, storage device 852 may be a hard disk drive or solid state drive. Storage device 852 may be a tape drive, magnetic drive, removable media drive, etc. in some embodiments. In the illustrated embodiment, storage device 852 includes data 854.

Data 854 may include instructions for executing a compiler, instructions for instantiating hardware, a hardware description, program code, or other forms of data.

In some embodiments, any of various operations discussed herein may be performed by executing program instructions stored on a non-transitory computer readable medium. Such program instructions may be executed using system 800, for example. In these embodiments, the non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9B:
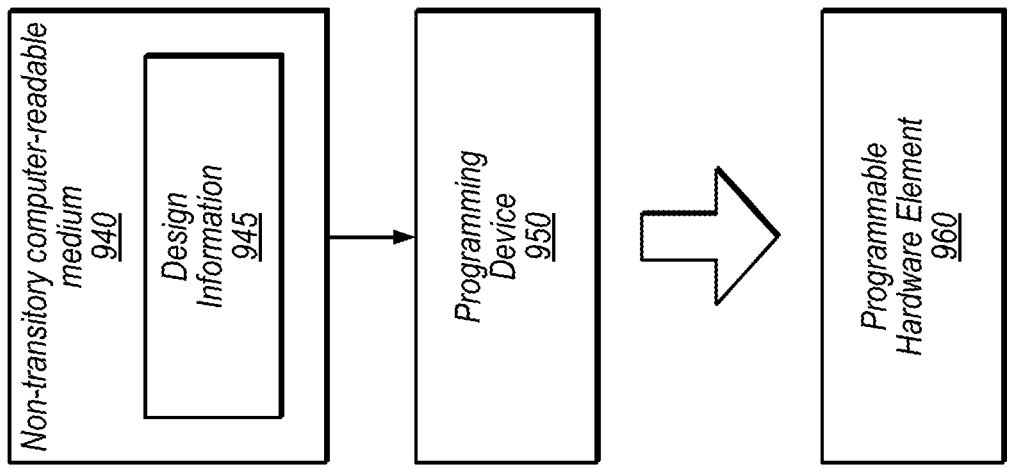
FIG. 9A-B are a block diagrams illustrating computer-readable media, according to some embodiments.
Figure 9A:
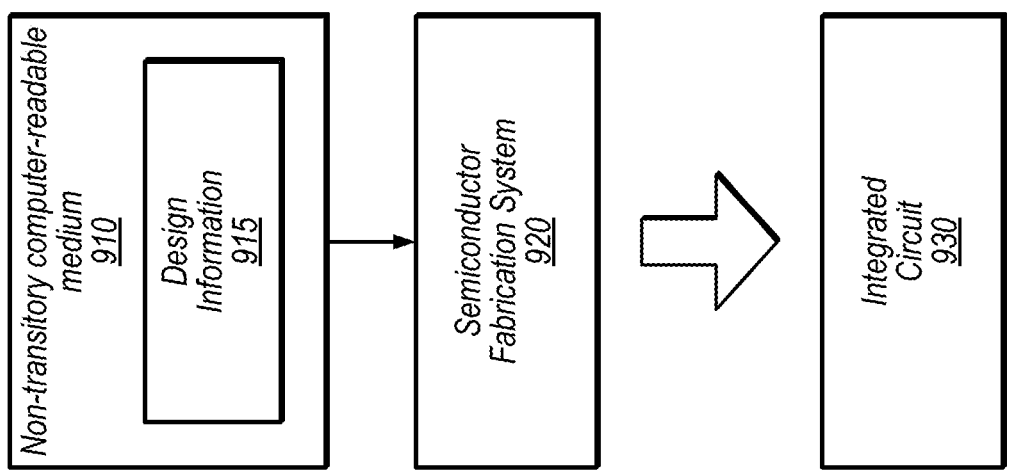

FIG. 9A is a block diagram illustrating an exemplary non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable medium 910, may comprise any of various appropriate types of memory devices or storage devices. Medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 910 may include other types of non-transitory memory as well or combinations thereof. Medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis and/or layout of integrated circuit 930. In some embodiments, the design information is specified in whole or in part in the form of a netlist that specifies cell library elements and their connectivity.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1-5. Further, integrated circuit 930 may be configured to perform various functions described herein in conjunction with other components. Further, the functionality described herein may be performed by multiple connected integrated circuits.

FIG. 9B is a block diagram illustrating an exemplary non-transitory computer-readable storage medium that stores design information for a programmable hardware element, according to some embodiments. In the illustrated embodiment programming device 950 is configured to process the design information 945 stored on non-transitory computer-readable medium 940 and program programmable hardware element 960 based on the design information 945.

Medium 940 and design information 945 may have features similar to medium 910 and design information 915, as discussed above. Hardware description languages used to design ASICs may be similar or different than those used to program programmable hardware elements. Programmable hardware element 960 may be a field-programmable gate array (FPGA), programmable logic array (PLA), complex programmable logic device (CPLD) etc. Programmable hardware element 960 may include logic blocks, hard blocks for common functions, configurable clocking structures, memories, fuses, etc. A given programmable hardware element 960 may be programmed differently at different times, e.g., by adjusting the functionality of the logic blocks, interconnections between circuit elements, etc.

In various embodiments, programmable hardware element 960 is configured, after being programmed, to operate according to the circuit design specified by design information 945, which may include performing any of the functionality described herein. For example, programmable hardware element 960 may implement any of various elements shown in FIGS. 1-5. Further, programmable hardware element 960 may be configured to perform various functions described herein in conjunction with other components. Further, the functionality described herein may be performed by multiple connected programmable hardware elements.

As used herein, the term "implement the circuit according to the design" includes both fabricating an integrated circuit according to the design and programming a programmable hardware element according to the design. Semiconductor fabrication system 920 and programming device 950 are examples of computing systems configured to implement circuits according to design information. Speaking generally, implementing a circuit according to a design may include other ways to implement hardware circuits in addition to the techniques discussed with references to FIGS. 9A and 9B. This term is intended to cover all such techniques for implementing hardware circuits according to design information stored in a computer-readable medium.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    detecting, by a computing system, within a program, an indication of execution parallelism for a function, wherein the indication indicates a first number of independent instances of the function that operate on different sets of input data;
    instantiating, by the computing system in a programmable hardware element, interface circuitry configured to provide the sets of input data to one or more functional blocks to perform the function, wherein the interface circuitry is configured to receive data based on a first clock signal that has a first frequency;
    instantiating, by the computing system in the programmable hardware element, a second number of functional blocks configured to perform the function, wherein the first number is different than the second number, wherein at least one of the instantiated functional blocks are configured to:
        operate based on a second clock signal that has a second frequency that is different than the first frequency; and
        retrieve data from the interface circuitry based on the second clock signal, wherein the interface circuitry includes at least one commutator, wherein the commutator is configured to receive the sets of input data and switch between distributing the sets of input data to different ones of the second number of functional blocks.

2. The method of claim 1, wherein the interface circuitry includes at least one multi-clock buffer, wherein the multi-clock buffer is configured to receive data at the first clock frequency and distribute data at the second clock frequency.

3. The method of claim 1, wherein the interface circuitry includes at least first and second multi-clock buffers and at least one de-commutator, wherein a first multi-clock buffer is configured to receive data at the first clock frequency and distribute data to the commutator at a second clock frequency, and wherein the commutator is configured to receive data from the first multi-clock buffer, and wherein the de-commutator is configured to receive data from the second number of functional blocks and distribute data to the second multi-clock buffer at the second frequency, and wherein the second multi-clock buffer is configured to receive data from the de-commutator at the second frequency and transmit data at the first frequency.

4. The method of claim 1, further comprising: determining the second number of functional blocks based on the second frequency and the first number of instances of the function.

5. The method of claim 1, further comprising:
    evaluating performance of multiple configurations with multiple different numbers of functional blocks; and
    selecting the second number of functional blocks based on results of the evaluating and one or more criteria.

6. The method of claim 1, wherein at least one of the instantiated functional blocks is further configured to perform the function at least twice for different input data.

7. The method of claim 1, wherein the detecting an indication of execution parallelism includes identifying a program statement, wherein the program statement indicates the function and the first number of instances of the function.

8. A non-transitory computer-readable storage medium having instructions stored thereon that are executable by a computing system to perform operations comprising:
    detecting, by a computing system, a specification of parallelism for a function of a program such that a first number of independent instances of the function are executable in parallel on different sets of input data;
    instantiate, by the computing system in a hardware description, interface circuitry configured to provide the sets of input data to one or more functional blocks to perform the function, wherein the interface circuitry is configured to receive data based on a first clock signal that has a first frequency;
    determine, by the computing system, a second number of functional blocks configured to perform the function, wherein the second number is different than the first number; and
    instantiate, by the computing system in the hardware description, the second number of functional blocks, wherein at least one of the instantiated functional blocks are configured to:
        operate based on a second clock signal that has a second frequency that is greater than the first frequency; and
        retrieve data from the interface circuitry based on the second clock signal, wherein the interface circuitry includes at least one commutator, wherein the commutator is configured to receive the sets of input data and switch between distributing the sets of input data to different ones of the second number of functional blocks.

9. The medium of claim 8, wherein determining the second number of functional blocks includes generating a plurality of configurations that include different numbers of functional blocks for the function and selecting one of the configurations based on one or more criteria.

10. The medium of claim 8, wherein determining the second number of functional blocks is based at least in part on a set of constraints input by a user.

11. The medium of claim 8, further comprising instantiating a programmable hardware element based on the hardware description.

12. The medium of claim 8, wherein the interface circuitry includes at least first and second multi-clock buffers and at least one de-commutator, wherein a first multi-clock buffer is configured to receive data at the first clock frequency and distribute data to the commutator at a second clock frequency, and wherein the commutator is configured to receive data from the first multi-clock buffer, and wherein the de-commutator is configured to receive data from the second number of functional blocks and distribute data to the second multi-clock buffer at the second frequency, and wherein the second multi-clock buffer is configured to receive data from the de-commutator at the second frequency and transmit data at the first frequency.

13. A method, comprising:
    detecting, by a computing system, an indication of execution parallelism for a function in a program, wherein the indication indicates a first number of independent instances of the function that operate on different sets of input data;
    generating hardware description data, by the computing system, that specifies configuration of:
        interface circuitry configured to provide sets of input data to one or more functional blocks to perform the function, wherein the interface circuitry is configured to receive data based on a first clock signal that has a first frequency; and
        a second number of functional blocks configured to perform the function, wherein the first number is different than the second number, wherein the interface circuitry includes at least one commutator, wherein the commutator is configured to receive the sets of input data and switch between distributing the sets of input data to different ones of the second number of functional blocks, wherein at least one of the functional blocks is configured to:
            operate based on a second clock signal that has a second frequency that is different than the first frequency;
            retrieve data from the interface circuitry based on the second clock signal; and
    storing the generated hardware description data using a non-transitory computer-readable medium.

14. The method of claim 13, further comprising configuring circuitry according to the hardware description data.

15. The method of claim 13, further comprising determining the second number of functional blocks based on the second frequency and the first number of instances of the function.

16. The method of claim 13, wherein generating hardware description data includes performing analysis to determine one or more of performance characteristics, power characteristics, and resource utilization characteristics for configurations with multiple different numbers of functional blocks performing the function in parallel; and
    selecting the second number of functional blocks based on results of the analyzing and one or more criteria.

17. The method of claim 13, further comprising: determining the second number of functional blocks based at least in part on a set of constraints input by a user, wherein the constraints include at least one of area, speed, power, or number of functional blocks.

18. The method of claim 13, wherein the hardware description data specifies at least one multi-clock buffer configured to receive data at the first clock frequency and distribute data at the second clock frequency.

19. The method of claim 13, wherein at least one of the functional blocks is further configured to perform the function at least twice for different input data.

* * * * *